April 17, 1956 T. GRETHER 2,742,196
DISTRIBUTOR FOR FERTILIZERS, DUSTS, AND THE LIKE
Filed Sept. 21, 1951 3 Sheets-Sheet 1

TOBIAS GRETHER,
INVENTOR.

BY Hazard & Miller
ATTORNEYS

April 17, 1956     T. GRETHER     2,742,196
DISTRIBUTOR FOR FERTILIZERS, DUSTS, AND THE LIKE
Filed Sept. 21, 1951     3 Sheets-Sheet 2

TOBIAS GRETHER,
INVENTOR.

BY Hazard & Miller
ATTORNEYS

United States Patent Office 2,742,196
Patented Apr. 17, 1956

2,742,196

DISTRIBUTOR FOR FERTILIZERS, DUSTS, AND THE LIKE

Tobias Grether, Camarillo, Calif.

Application September 21, 1951, Serial No. 247,692

10 Claims. (Cl. 222—227)

This invention relates to a fertilizer distributor, and may be considered as an improvement over the fertilizer distributor disclosed in United States Letters Patent No. 2,405,824, issued August 13, 1946, to Hermann E. Grether.

An object of the present invention is to provide an improved fertilizer distributor designed to distribute or feed into a fertilizer drill dry fertilizers such as for example ammonium phosphate or urea with great accuracy and uniformity.

Explanatory of the present invention, the so-called dry fertilizers, such as ammonium phosphate and urea, are quite hygroscopic so that the angle of repose of granular fertilizer varies considerably from day to day and throughout a single day due to changes in relative humidity. The amount of moisture absorbed by such fertilizers is thus continually varying and consequently the angle of repose of such fertilizers varies considerably. This variation makes it extremely difficult, if at all possible in the usual fertilizer distributor to maintain an even and uniform distribution. As a result many farmers have abandoned the use of dry fertilizers in preference to liquid fertilizers.

It is therefore a primary object of the present invention to provide an improved fertilizer distributor wherein despite the hygroscopic nature of the material variations in temperature and in relative humidity and the consequent angle of repose, a highly uniform distribution can be secured.

Another object of the invention is to provide a fertilizer distributor that is applicable to the tool bar or draw bar of a tractor, and to provide a novel and relatively simple means for driving the distributor which is so arranged that when the tool bar or draw bar of the tractor is elevated to withdraw the fertilizer drills from the soil, operation of the distributor will be immediately discontinued, thus preventing waste of the fertilizer. When the tool bar or draw bar is lowered to lower the drills into the ground the fertilizer distributor is automatically set in operation.

Still another object of the invention is to provide a fertilizer distributor wherein there is a hopper adapted to receive the fertilizer and wherein the fertilizer is accurately metered from the hopper onto a rotary subplate and then deflected from the subplate to the fertilizer drills. In this manner, pulsations in the amount of fertilizer fed from the hopper by the metering means are effectively dampened or smoothed out so that the feed into the fertilizer drills is of a substantially constant and uniform amount regardless of the variable conditions above referred to and also regardless of the speed of operation of the distributor.

With the foregoing and other objects in view, which will be made manifest in the following detailed description and specifically pointed out in the appended claims, reference is had to the accompanying drawings for an illustrative embodiment of the invention, wherein:

Fig. 2 may also be regarded as a vertical section taken substantially upon the line 2—2 in Fig. 3.

Figure 1:
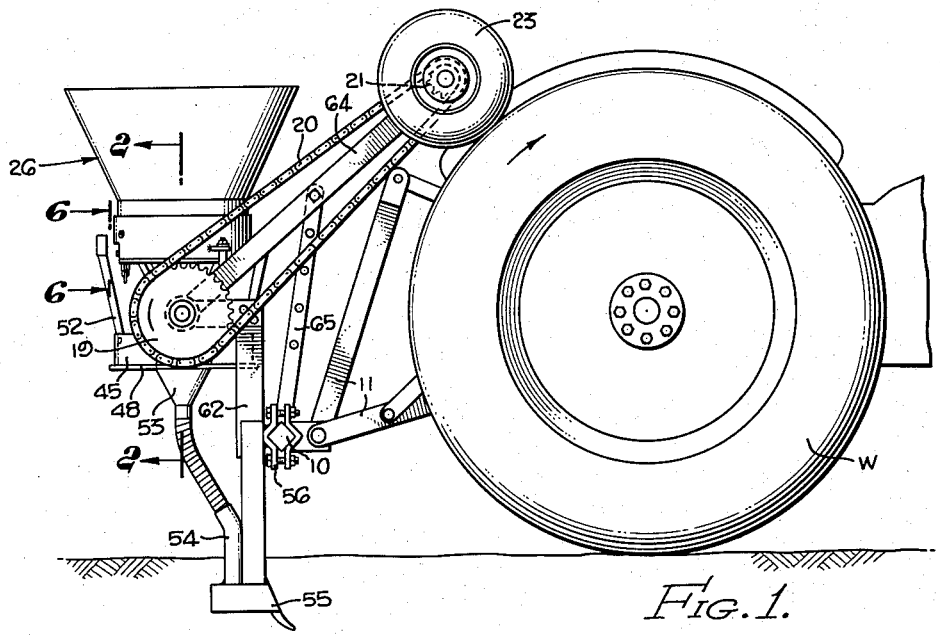
Figure 1 is a view in side elevation of the rear portion of the tractor illustrating a fertilizer distributor embodying the present invention as having been applied thereto.
Figure 2:
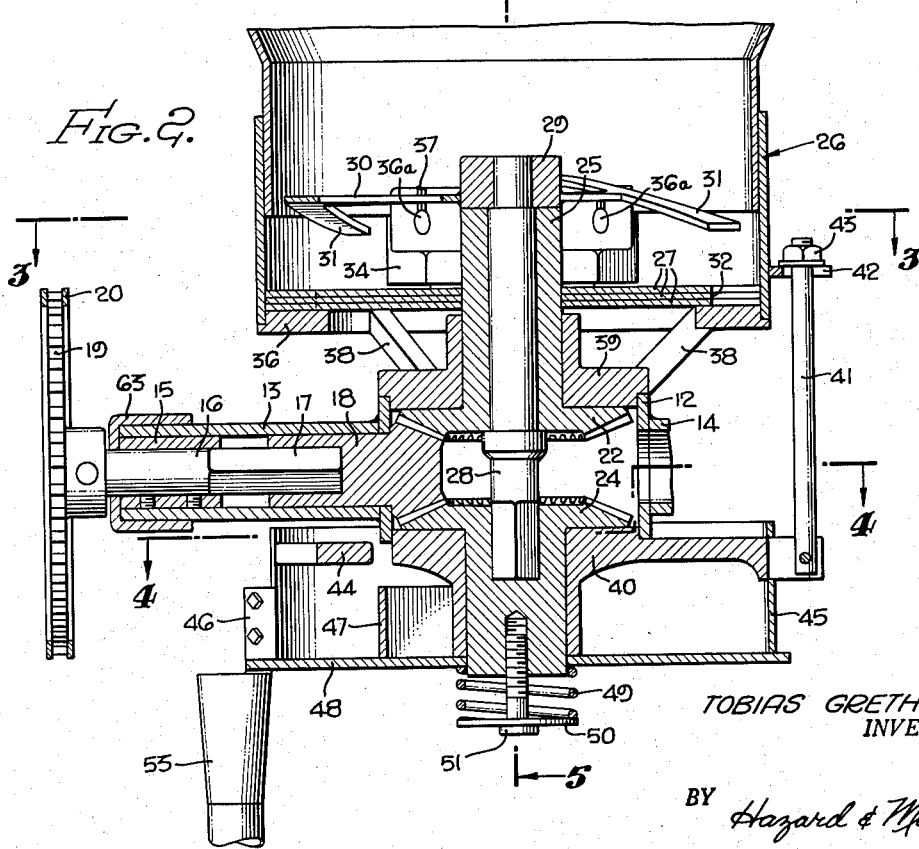
Fig. 2 is a vertical section through the distributor taken substantially upon the line 2—2 in Fig. 1 in the direction indicated.

Referring to the accompanying drawings wherein similar reference characters designate similar parts throughout, particularly, Figs. 1 and 2, W indicates a drive wheel of a tractor having a tool bar or draw bar generally indicated at 10. This tool bar or draw bar is adapted to be hydraulically elevated and lowered with respect to the tractor such as by linkage generally indicated at 11.

The fertilizer distributor embodying the present invention comprises a gear housing consisting of a central cylindrical part 12 from which there extend diametrically opposed tubular portions 13 and 14. Either of the portions 13 or 14 is adapted to receive a bushing 15 and a spindle 16, the inner end of which is preferably squared as indicated at 17 and is receivable in a beveled pinion 18. The spindle 16 is adapted to be driven by means of a sprocket 19 which, in turn, is rotated by an endless chain 20 trained over a sprocket 21 on a short shaft which carries a friction wheel 23. The friction wheel 23 is engageable with the wheel W so that as the tractor moves forwardly the friction wheel will drive the chain 20, the sprocket 19 and thus turn the spindle 16 and beveled pinion 18.

Within the cylindrical portion 12 of the gear housing there are disposed upper and lower bevel gears 22 and 24 which mesh with the top and bottom of the pinion 18, respectively. The upper of these gears 22 has an extended hub 25 that extends upwardly into a hopper generally indicated at 26. This hub is externally grooved or rendered non-circular and has telescoped thereon one or more metering plates 27. These metering plates fit the non-circular exterior of the hub 25 so as to have a driving connection with the gear 22. Consequently, when the spindle 16 is rotated the gear 22 will be rotated and the metering plates 27 will be rotated in the bottom of the hopper therewith.

Figure 3:
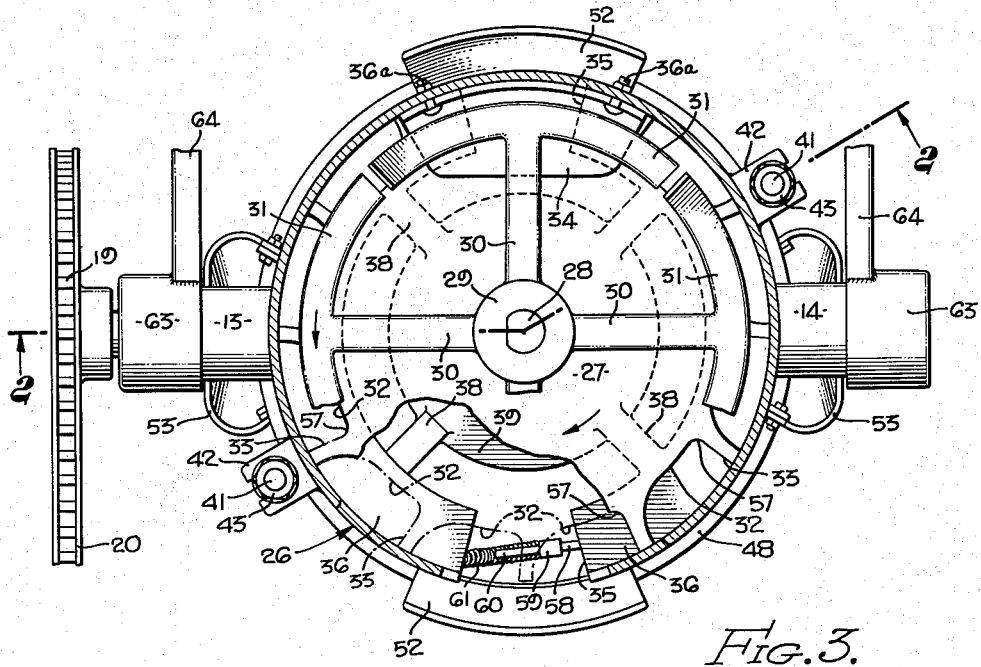
Fig. 3 is a horizontal section taken substantially upon the line 3—3 in Fig. 2 in the direction indicated, parts being broken away to expose lower parts.
Figure 5:
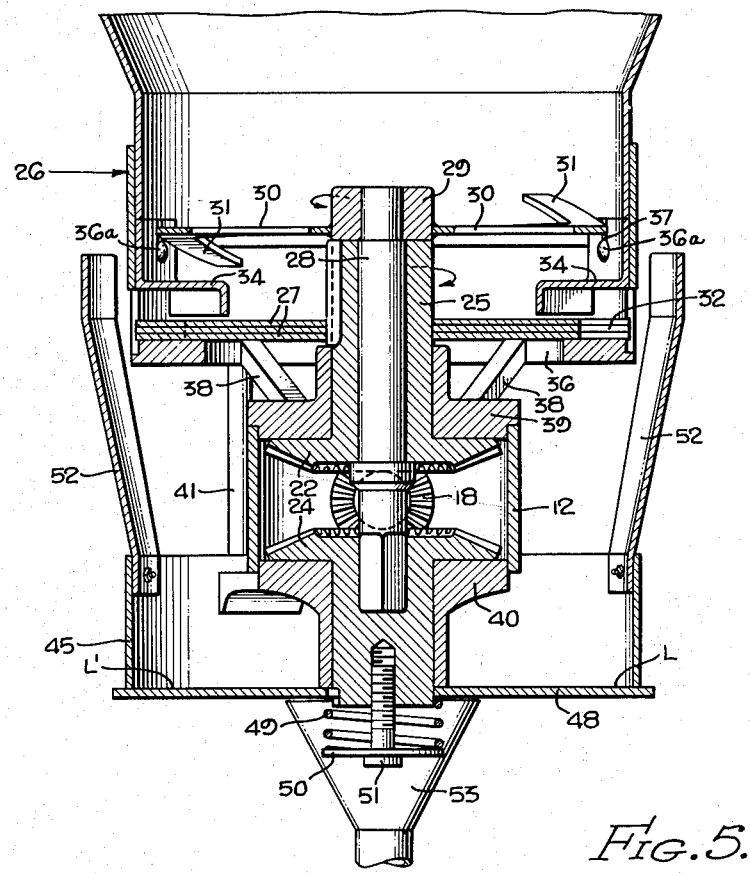
Fig. 5 is a vertical section taken substantially upon the line 5—5 in Fig. 2.

Referring particularly to Figs. 2, 3 and 5, the lower bevel gear 24 receives the square or non-circular lower end of a second spindle 28 which rotatably extends through the hub 25 and has its upper end flattened or rendered non-circular to receive the hub 29 of an agitator 30. The agitator 30 consists of a plurality of radial arms, each of which carries at its outer end inclined depressor or agitator blade 31. As shown in Fig. 5, it will be observed from the relationship of the gears 22 and 24 with respect to spindle 18 that the metering plates 27 will be rotated by the gear 22 in one direction while the spindle 28 and the agitator 30 will be rotated by the gear 24 in the opposite direction. This is highly advantageous in a distributor of this kind in that if the agitator and metering plates rotate together or in the same direction the fertilizer by reason of its hygroscopic nature, may pack into a relatively solid mass and turn as a unit within the hopper. If the metering plates and agitator rotate in opposite directions the agitator and metering plates cooperatively tend to keep the fertilizer stirred up or broken sufficiently so that proper metering can be secured.

The metering plates 27 have peripheral notches or pockets formed in their edges such pockets being indicated at 32 (Fig. 3). If more than one metering plate is used the superposed metering plates have their pockets so arranged so as to be in direct vertical alignment with the pockets of the plates therebeneath. The number of plates applied to the hub 25 consequently controls the height or thickness of each pocket in the metering means from the hopper. In the preferred form of construction the trailing edges of the pockets 32 which are indicated at 33 are almost radial so as to secure a straight ahead push on the fertilizer that is fed into the pockets. Usually, however, these edges are not exactly radial but are tilted rearwardly at about 8° to a radius.

On diametrically opposite sides of the hopper there are secured covers 34 (Figs. 1 and 3). These covers are arranged vertically over openings 35 in a metering plate base 36. The covers are designed to fit against the interior of the hopper and are vertically adjustable with respect thereto by means of bolts 36a extending through slots 37 therein. If the number of metering plates 27 employed is increased or decreased covers 34 can be raised or lowered by means of this adjustment so that the bottom edges of the covers will be disposed in close proximity to the uppermost metering plate. The bottom edges of the covers are designed to shear off fertilizer that has dropped into the pockets 32 and as the fertilizer in any given pocket passes over the opening 35 in the base plate 36, the fertilizer in the pocket is free to fall from the pocket through the opening 35. Other fertilizer in the hopper is held against following the fertilizer dropping from a pocket 32 by the overlying cover 34. When any given pocket 32 passes from beneath a cover it is available to receive fertilizer from the hopper.

Figure 4:
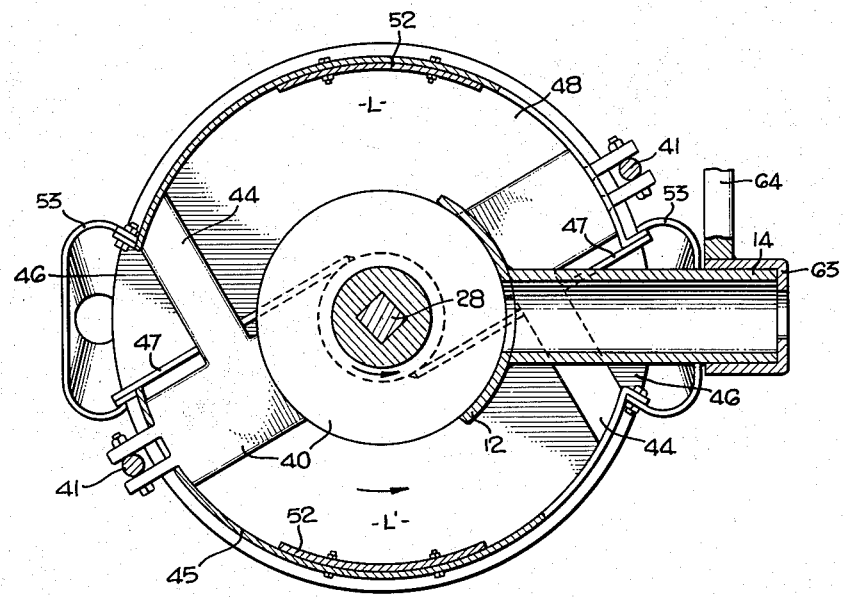
Fig. 4 is a horizontal section taken substantially upon the line 4—4 in Fig. 2.

The metering plate base 36 is supported by inclined arms 38 from a cover 39 for the central portion 12 of the gear housing. The metering plate base 36, arms 38 and cover 39 comprise a stationary frame structure which supports the hopper and metering plate means. This cover 39 also provides a bearing for the hub 25 of the upper gear 22. The bottom of the central portion 12 of the gear housing is closed by a bottom member 40 extending diametrically thereacross and providing a bearing for the lower gear 24. This bottom member has its ends bifurcated to pivotally receive clamping bolts 41 which can be swung upwardly into bifurcated ears 42 on the exterior of the hopper (Figs. 2 and 3). On tightening the nuts 43 the base member 40, gear housing, metering plate base 36, and hopper 26 are all effectively clamped together. The base member 40 also provides arms 44 (Figs. 2 and 4) which cooperate with the ends of the base member to support a cylindrical confining member 45 having outlets 46 at diametrically opposite sides thereof. The base member 40 also provides supporting deflectors 47 which extend from the hub portion of the base member that provides the bearing for the gear 24 to the side of each outlet. The deflectors 47 are arranged over a subplate 48 that is urged upwardly by means of a compression spring 49 seated on a spring seat 50 on screw 51 that is mounted on the bottom of the gear 24. This subplate fits a non-circular portion on the bottom of the gear so as to have a driving connection therewith and to be rotatable thereby. Subplate 48 is constantly urged by the spring 49 into close wiping engagement with the bottom edges of the confining member 45 and the deflectors 47.

The openings 35 in the metering plate base 36 are so arranged as to deposit the fertilizer dropping from the pockets 32 onto the subplate 48 at approximately the localities indicated at L and L' (Fig. 4) and as the fertilizer in some instances may splatter considerably, guards 52 are secured to the confining member 45 and extend upwardly therefrom to points adjacent the exterior of the hopper 26 (Fig. 5). Collecting funnels 53 are secured to the sides of the confining member adjacent the outlets 46 (Fig. 1). These collecting funnels in turn discharge into a fertilizer drill 54, the plow of which is indicated at 55. The shank of the plow may be attached to the tool or draw bar, such as by a clamp 56.

Figure 6:
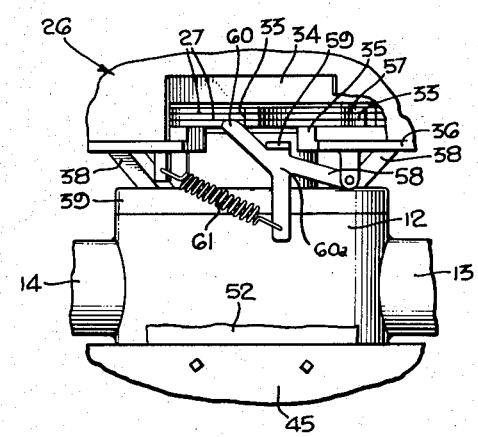
Fig. 6 is a partial view in side elevation, and may be regarded as having been taken substantially upon the line 6—6 in Fig. 1 to illustrate a detail of construction.

The operation of the above described construction is substantially as follows. The dry fertilizer is placed in the hopper 26 and as the tractor proceeds the pinion 18 will be driven as above explained, rotating the spindle 28 and agitator 30 in one direction and rotating the gear 22 and the metering plates 27 in the opposite direction. During rotation of the agitator the inclined paddles or vanes 31 tend to continually press and work the fertilizer downwardly within the hopper as well as to break up the fertilizer into small portions that can enter the pockets 32 on the meter plates. These pockets in the metering plates will consequently become filled and on passing beneath the covers the contents of each pocket may drop through the opening 35 onto the subplate 48 at the localities indicated L and L'. As the subplate 48 is rotated by the gear 24 the deposited fertilizer will encounter the deflectors 47 and be directed thereby into the funnels 53. While the deposits on the subplate from the consecutive pockets 32 will be in certain volumetric amounts and will be to some extent pulsating, the sweeping of the fertilizer by the deflectors 47 through the outlets 46 tends to dampen the pulsating effect so that the supply to each funnel is practically steady and continuous and of uniform quantity. The rear corners indicated at 57 of the pockets 32 are of relatively sharp radius and it sometimes happens that the fertilizer, because of its hygroscopic and sticky nature, tends to stick in these corners. To overcome such sticking effect I arrange knockers beneath the openings 35. Such knockers 60a are as illustrated in Fig. 6, consisting of bars 58 pivoted to the underside of the metering plate base. These bars carry small platforms 59 on which a small amount of fertilizer may be deposited. They also carry fingers 60 which are engageable with the divisions between the pockets 32 so as to be depressed thereby against the action of a tension spring 61 which connects an arm on each bar with the metering plate base. The platforms 59 are arranged to be traversed by the corners 57 of the pockets 32 and as the divisions between the pockets 32 engage the finger 60 the knockers are depressed and then are released to fly upwardly under the action of the tension spring 61. The small amount of fertilizer that is deposited on the platform 59 is consequently forcibly thrown upwardly through the corners 57 and will serve to dislodge any fertilizer tending to stick or adhere in these corners.

The gear housing is mounted on the tool bar or draw bar 10, such as by angular supports 62 which are welded or otherwise secured to the gear housing. The ends of the gear housing are largely covered by end caps 63 to which frame members 64 are welded which serve to support the short shaft on which the sprocket 21 and traction wheel 23 are mounted. 65 indicates an adjustable brace that connects the tool or draw bar 10 with the frame member 64. By reversing the positions of the end caps 63 on the gear housing the relationship of the fertilizer distributor to the wheel W can be varied. In this manner, the fertilizer distributor as well as the fertilizer drills can be adjusted along the length of the tool bar or draw bar 10.

When it is desired to empty the distributor and to clean the hopper 26 it is merely necessary to loosen the bolts 41. This enables the hopper, the metering plates 27, the metering plate base 36, the gear 22 and the spindle 28 to be bodily removed from the remaining structure and the contents of the hopper can be readily emptied therefrom by turning the hopper into an inverted position.

From the above described construction it will be appreciated that a novel fertilizer distributor has been provided which is of relatively simple and highly durable construction. It is highly advantageous in that it is capable of handling hygroscopic fertilizers under a variety of different conditions. The amount of fertilizer fed to the funnels per linear foot of travel of the tractor can be varied by increasing or decreasing the number of metering plates 27. Regardless of the number of metering plates present, the amount of fertilizer deposited on the subplate 48 is fed at a constant or uniform rate into the funnels. In the course of fertilizing, when the tractor reaches the border of a field and the draw bar 10 is elevated, this withdraws the fertilizer shoes from the soil. At the same time traction wheel 23 is disengaged from the wheel W so that the fertilizer distributor is automatically caused to discontinue operation. Consequently, no fertilizer will be fed to the fertilizer shoe and be wasted while the shoe is in elevated position. On returning the fertilizer shoe to the soil the traction wheel 23 is automatically reengaged with the wheel W and the fertilizer distributor caused to re-commence operation.

Various changes may be made in the details of construction without departing from the spirit and scope of the invention as defined by the appended claims.

I claim:

1. A fertilizer distributor comprising a hopper, rotary agitating means within the hopper for agitating said fertilizer, rotatable metering means for metering fertilizer placed in the hopper therefrom, and means for rotating said metering means in a direction counter to said agitating means, a rotatable subplate beneath the metering means on which the metered fertilizer may drop, means for rotating the subplate and deflecting means arranged over the subplate for deflecting fertilizer therefrom as the subplate rotates.

2. A fertilizer distributor comprising a hopper adapted to receive fertilizer, rotary agitating means in the hopper for agitating fertilizer therein, means for rotating the agitating means, one or more metering plates in the bottom of the hopper having passages therein through which the fertilizer may pass from the hopper, a metering plate base beneath the metering plates having openings therethrough through which the fertilizer may pass from the metering plates, covers in the hopper over the openings in the metering plate base, and means for rotating the metering plates in a direction opposite the direction of rotation of the agitating means.

3. A fertilizer distributor comprising a hopper adapted to receive fertilizer, rotary agitaing means in the hopper for agitating fertilizer therein, means for rotating the agitating means, one or more metering plates in the bottom of the hopper having passages therein through which the fertilizer may pass from the hopper, a metering plate base beneath the metering plates having openings therethrough through which the fertilizer may pass from the metering plates, covers in the hopper over the openings in the metering plate base, and means for rotating the metering plates in a direction opposite the direction of rotation of the agitating means, a subplate beneath the metering plate base on which the metered fertilizer may fall, means for rotating the subplate, and deflecting means for deflecting fertilizer from the subplate.

4. A fertilizer distributor comprising a hopper adapted to receive fertilizer, rotary agitating means in the hopper for agitating fertilizer therein, means for rotating the agitating means, one or more metering plates in the bottom of the hopper having passages therein through which the fertilizer may pass from the hopper, a metering plate base beneath the metering plates having openings therethrough through which the fertilizer may pass from the metering plates, covers in the hopper over the openings in the metering plate base, means for rotating the metering plates in a direction opposite the direction of rotation of the agitating means, a subplate beneath the metering plate base on which the metered fertilizer may fall, means for rotating the subplate, and deflecting means for deflecting fertilizer from the subplate, said deflecting means being arranged nonradially with respect to the subplate.

5. In a fertilizer distributor, a spindle, means for rotating the spindle, a beveled pinion on the spindle, beveled gears above and below the pinion and meshing therewith, a second spindle having a driving connection with the lower gear and rotatably extending through the upper gear, a hopper, an agitator in the hopper having a driving connection with the upper end of the second spindle, one or more metering plates in the bottom of the hopper having a driving connection with the upper gear, a metering plate base beneath the metering plates having one or more openings therein adapted to be consecutively registered with by the openings in the metering plates, a subplate having a driving connection with the lower gear arranged beneath the metering plate base, and deflecting means arranged over the subplate.

6. In a fertilizer distributor, a spindle, means for rotating the spindle, a beveled pinion on the spindle, beveled gears above and below the pinion and meshing therewith, a second spindle having a driving connection with the lower gear and rotatably extending through the upper gear, a hopper, an agitator in the hopper having a driving connection with the upper end of the second spindle, one or more metering plates in the bottom of the hopper having a driving connection with the upper gear, a metering plate base beneath the metering plates having one or more openings therein adapted to be consecutively registered with by the openings in the metering plates, a subplate having a driving connection with the lower gear arranged beneath the metering plate base, deflecting means arranged over the subplate, and covers in the hopper over the openings in the metering plate base.

7. In a fertilizer distributor, a rotary subplate, means for delivering fertilizer in metered quantity to the subplate, splatter guards on the subplate, said splatter guards spanning the distance between said subplate and said means to prevent the splattering of the fertilizer delivered to the subplate and from the means, and deflecting means arranged over the subplate for deflecting fertilizer therefrom.

8. A fertilizer distributor comprising a fertilizer receiving hopper, an agitator in said hopper for agitating said fertilizer, fertilizer metering means within said hopper, a subplate for receiving fertilizer from said metering means, means for rotating said agitator, said metering means and said subplate, a frame structure between said hopper and said means for rotating said agitator upon which said hopper and said metering means are supported and freely removable therefrom, and a bottom member between said subplate and said hopper, said bottom member and subplate being releasably supported by said hopper.

9. A fertilizer distributor comprising a fertilizer receiving hopper, means within the hopper for agitating and comminuting fertilizer, metering means within the hopper for metering said fertilizer, a subplate for receiving fertilizer from said metering means, structure for conveying fertilizer from the subplate to the ground, an element for rotating said agitating means, metering means and said subplate, structure between said element and said hopper upon which said hopper, said agitating means and said metering means are supported and freely removable therefrom, and a member between said subplate and said element, said member and subplate being releasably supported by said hopper.

10. A fertilizer distributor comprising a fertilizer receiving hopper, an agitator in said hopper for agitating said fertilizer, fertilizer metering plates within said hopper, a subplate for receiving fertilizer from said metering plates, structure for conveying fertilizer from the subplate to the ground, means for rotating said agitator, said metering plates and said subplate, cover structure between said means and said hopper upon which said hopper and said metering plates are supported and freely removable therefrom, a bottom member between said subplate and said means, means releasably interconnecting said bottom member and subplate to said hopper, said bottom member and subplate being supported by said cover structure.

References Cited in the file of this patent

UNITED STATES PATENTS

| | | |
|---|---|---|
| 349,527 | Shank et al. | Sept. 21, 1886 |
| 895,489 | Morse | Aug. 11, 1908 |
| 1,189,718 | Michael et al. | July 4, 1916 |
| 1,918,172 | Barron et al. | July 11, 1933 |
| 2,017,304 | Blackney | Oct. 15, 1935 |
| 2,280,166 | Sinden | Apr. 21, 1942 |
| 2,369,508 | White | Feb. 13, 1945 |
| 2,405,824 | Grether | Aug. 13, 1946 |